United States Patent
McKeel et al.

(10) Patent No.: US 10,588,430 B2
(45) Date of Patent: Mar. 17, 2020

(54) CLIP FOR SECURING ELONGATED LABEL TRACK AND ASSOCIATED SYSTEMS AND METHODS

(71) Applicant: Walmart Apollo, LLC, Bentonville, AR (US)

(72) Inventors: Robert Leslie Brock McKeel, Rogers, AR (US); Rhonda Meade, Rogers, AR (US)

(73) Assignee: Walmart Apollo, LLC, Bentonville, AR (US)

( * ) Notice: Subject to any disclaimer, the term of this patent is extended or adjusted under 35 U.S.C. 154(b) by 0 days.

(21) Appl. No.: 16/213,154

(22) Filed: Dec. 7, 2018

(65) Prior Publication Data
US 2019/0104865 A1    Apr. 11, 2019

Related U.S. Application Data

(63) Continuation of application No. 15/411,240, filed on Jan. 20, 2017, now Pat. No. 10,182,668.

(60) Provisional application No. 62/286,076, filed on Jan. 22, 2016.

(51) Int. Cl.
| | |
|---|---|
| A47F 5/00 | (2006.01) |
| F16B 2/22 | (2006.01) |
| G09F 3/16 | (2006.01) |
| G09F 3/20 | (2006.01) |
| F16M 13/02 | (2006.01) |

(52) U.S. Cl.
CPC ............. *A47F 5/0068* (2013.01); *F16B 2/22* (2013.01); *F16M 13/022* (2013.01); *G09F 3/16* (2013.01); *G09F 3/204* (2013.01)

(58) Field of Classification Search
CPC .......... A47F 5/0068; F16B 2/22; G09F 3/204; G09F 3/16; F16M 13/022
USPC ........................................... 248/227.1–227.3
See application file for complete search history.

(56) References Cited

U.S. PATENT DOCUMENTS

| | | | |
|---|---|---|---|
| 1,307,069 A | 6/1919 | Weismantel | |
| 1,417,325 A * | 5/1922 | Hopp | G09F 3/20 40/658 |
| 3,089,211 A | 5/1963 | Perusse | |
| 3,248,765 A | 5/1966 | Achabal et al. | |

(Continued)

OTHER PUBLICATIONS

Absolute musueam & gallery products, Shelf Edge Label Holder, http://us.absoluteproduct.com/shelf-edge-label-holder.html, last viewed Nov. 16, 2015.

(Continued)

*Primary Examiner* — Ko H Chan
(74) *Attorney, Agent, or Firm* — McCarter & English, LLP; David R. Burns

(57) ABSTRACT

Exemplary embodiments are generally directed to clips and associated systems and methods for securing elongated label tracks. Exemplary embodiments include a top portion, an intermediate portion and a bottom portion. The top portion can be configured to secure to a top surface of a shelf or base deck. The intermediate portion can be configured to retain a portion of an elongated label track against a front face of the shelf or base deck. The bottom portion can be configured to engage a bottom surface of the shelf or base deck and support the elongated label track. The intermediate portion can extend at a first angle with respect to the top portion and a second angle with respect to the bottom portion.

8 Claims, 9 Drawing Sheets

(56) References Cited

U.S. PATENT DOCUMENTS

| | | | | |
|---|---|---|---|---|
| 3,688,915 | A | 9/1972 | Ramsey | |
| 3,746,295 | A * | 7/1973 | Stepanek | A47F 5/0068 248/447.2 |
| 4,032,101 | A * | 6/1977 | Immordino | A47B 96/06 248/231.31 |
| 4,312,295 | A * | 1/1982 | Harrington | A01K 1/0114 119/167 |
| 4,397,438 | A | 8/1983 | Chapman | |
| 4,606,280 | A * | 8/1986 | Poulton | A47F 5/0068 108/152 |
| 5,220,739 | A * | 6/1993 | Chich | G09F 13/04 40/550 |
| 5,473,833 | A * | 12/1995 | Ostrovsky | G09F 3/204 40/5 |
| 5,678,699 | A * | 10/1997 | Gebka | A47F 5/0068 211/113 |
| 5,887,731 | A | 3/1999 | Thalenfeld | |
| 5,913,270 | A | 6/1999 | Price | |
| 6,119,990 | A * | 9/2000 | Kump | A47F 5/0068 211/57.1 |
| 6,263,603 | B1 | 7/2001 | Wildrick | |
| 6,289,618 | B1 | 9/2001 | Kump et al. | |
| 6,354,546 | B1 | 3/2002 | Mueller | |
| 6,622,410 | B2 * | 9/2003 | Wilkes | A47F 5/0068 40/649 |
| 7,011,462 | B2 | 3/2006 | Hanaoka | |
| 7,839,521 | B2 | 11/2010 | Bard et al. | |
| D640,750 | S | 6/2011 | Bird et al. | |
| 8,333,285 | B2 | 12/2012 | Kiehnau et al. | |
| 8,767,241 | B2 | 7/2014 | Pan et al. | |
| 8,832,340 | B2 | 9/2014 | Miyachi et al. | |
| 10,202,995 | B2 * | 2/2019 | Stickelberger | F16B 2/22 |
| 2003/0098400 | A1 | 5/2003 | Fast et al. | |
| 2004/0050812 | A1 * | 3/2004 | Rojas | A47F 5/0068 211/134 |
| 2004/0237369 | A1 * | 12/2004 | Andersson | A47F 5/0068 40/661.03 |
| 2006/0075670 | A1 * | 4/2006 | Brinkman | G09F 3/204 40/666 |
| 2007/0044361 | A1 | 3/2007 | Gormley et al. | |
| 2007/0245611 | A1 * | 10/2007 | McDonald | G09F 3/204 40/661.03 |
| 2007/0268710 | A1 * | 11/2007 | Skiba | G02B 6/0091 362/396 |
| 2008/0141575 | A1 | 6/2008 | Keating | |
| 2009/0056185 | A1 | 3/2009 | Wamsley | |
| 2013/0032560 | A1 * | 2/2013 | Gregory | A47B 43/006 211/153 |
| 2013/0061500 | A1 | 3/2013 | Bird et al. | |
| 2013/0135665 | A1 | 5/2013 | Griffith et al. | |
| 2016/0133165 | A1 * | 5/2016 | Joliey | G09F 3/204 40/5 |

OTHER PUBLICATIONS

Alibaba Group, POP top clip data strip wood shelf clip label sign holder strip, http://www.aliexpress.com/item/POP-top-clip-data-strip-glass-wood-shelf-clip-label-sign-holder-strip/1856841286.html, last viewed Nov. 16, 2015.

TP Extrusions.com, Plastic ticket strips with clear cover flap for epos applications, https://www.tpextrusions.com/plastic-label-holders-flat-epos.html, last viewed Nov. 16, 2015.

Southern Imperial, Shelf Edge Dragon Clip, http://www.southernimperial.com/shelf-edge-dragonclip-p-5097.html, last viewed Nov. 16, 2015.

www.holders.com, Self-Piercing Flag Sign Holder, http://www.holders.com.mx/clips-y-portaprecios/41-self-piercing-flag-sign-holder, last viewed Nov. 16, 2015.

U.S. Appl. No. 15/411,240, filed Jan. 20, 2017, Robert Leslie Brock McKeel et al.

www.holders.com, Self-Piercing Flag Sign Holder, http://www.holders.com.mx/chps-y-portaprecios/41-self-piercing-flag-sign-holder, last viewed Nov. 16, 2015.

Breezy, Secure Cloud Printing Architecture, available at http://www.breezy.com/architecture/secure-cloud-printing-architecture.html, last viewed Jan. 5, 2016.

Papercut, Google Cloud Print, Centralize Cloud Print Management, available at http://www.papercut.com/tour/google-cloud-print/, last viewed Jan. 5, 2016.

Hewlett-Packard Development Company, L.P., Boost Your Business, Become a Public Print Location, available at http://h20195.www2.hp.com/v2/GetPDF.aspx/4AA1-9346ENW.pdf, last viewed Jan. 5, 2016.

\* cited by examiner

CLIP FOR SECURING ELONGATED LABEL TRACK AND ASSOCIATED SYSTEMS AND METHODS

CROSS-REFERENCE TO RELATED APPLICATIONS

This is a continuation application that claims the benefit of co-pending U.S. Non-Provisional patent application Ser. No. 15/411,240, which was filed on Jan. 20, 2017, which claims the benefit of commonly assigned U.S. Provisional Patent Application No. 62/286,076, which was filed on Jan. 22, 2016. The entire contents of the foregoing patent applications are incorporated herein by reference.

BACKGROUND

Retail establishments generally use shelves or base decks for displaying products to be purchased by customers. The shelves or base decks typically include a front face onto which labels including, for example, a product name, price, associated barcode, or the like, are affixed. Some retail establishments utilize label tracks formed as strips of plastic that can accommodate multiple labels across a length of a shelf, and the label track itself is affixed to the front face of the shelf. Corresponding products are positioned on the shelf above or below the appropriate label such that customers can conveniently visualize the price of the product to be purchased.

In a typical application, the label or label track can be secured to the front face of the shelf or base deck with adhesive. Due to a lack of sufficient adhesive, damage to the surface of the front face of the shelf or base deck, an unprepared front face surface, and/or a textured front face surface, the label or label track can become separated from the shelf or base deck, resulting in labels or label tracks that fall to the floor. Labels or label tracks can thereby be lost or damaged and products on the shelf or base deck can remain without the essential information needed by customers during shopping. Determining which products require new labels and replacement of such labels can be time consuming, increasing the costs associated with managing the retail establishment.

SUMMARY

Exemplary embodiments of the present disclosure overcome disadvantages of conventional systems and methods of affixing labels to shelves by providing for clips that advantageously engage the top, front and bottom surfaces of the shelf to secure an elongated label track against the front face of the shelf. Although discussed herein with respect to implementation on a shelf, it should be understood that the exemplary embodiments can be implemented in a substantially similar manner with base decks and that the terms "shelf" and "base deck" are used interchangeably herein. In accordance with embodiments of the present disclosure, an exemplary clip for securing an elongated label track to a shelf is provided. The shelf can include a top surface, a front face and a bottom surface. The clip can include a top portion, an intermediate portion and a bottom portion.

The top portion can have a first length extending from a first terminal end to a first transition portion. The top portion can be configured to secure to the top surface of the shelf. The intermediate portion can have a second length extending from the first transition portion to a second transition portion. The intermediate portion can be configured to retain a portion of an elongated label track against the front face of the shelf. The bottom portion can have a third length extending from the second transition portion to a second terminal end. The bottom portion can be configured to engage the bottom surface of the shelf and support the elongated label track. Engagement of the top, intermediate and bottom portions of the clip with the shelf advantageously maintains the elongated label track affixed to the shelf, thereby preventing the elongated label track from becoming separated from the shelf during use. The intermediate portion can extend at a first angle with respect to the top portion and a second angle with respect to the bottom portion.

In some embodiments, the first terminal end of the top portion can include a first locking mechanism. In some embodiments, the first locking mechanism can include a protrusion extending from a bottom surface of the top portion in a direction away from the intermediate portion. The protrusion can define a substantially hook-shaped or L-shaped configuration configured to be positioned within an aperture formed in the top surface of the shelf.

In some embodiments, the top portion can include a second locking mechanism disposed between the first terminal end and the first transition portion of the top portion. In some embodiments, the second locking mechanism can include two separated protrusions extending substantially perpendicularly away from the bottom surface of the top portion. The two separated protrusions can be configured to snap fit within a single aperture formed in the top surface of the shelf.

The bottom portion can extend substantially parallel to the top portion. In some embodiments, the bottom portion can be configured to snap around the bottom surface of the shelf to secure the bottom portion to the shelf. The first angle of the intermediate portion relative to the top portion and the second angle of the intermediate portion relative to the bottom portion can be different. In some embodiments, the first angle between the intermediate portion and the top portion can form an interior angle that is an obtuse angle. In some embodiments, the second angle between the intermediate portion and the bottom portion can form an interior angle that is an acute angle.

In some embodiments, the first transition portion can define a sharp corner. In some embodiments, the second transition portion can define a rounded corner with a radius. In some embodiments, the first length of the top portion can be dimensioned greater than the second length of the intermediate portion. In some embodiments, the second length of the intermediate portion can be dimensioned greater than the third length of the bottom portion.

In accordance with embodiments of the present disclosure, an exemplary system for securing an elongated label track to a shelf is provided. The system can include a shelf, an elongated label track, and clips. The shelf can include a top surface, a front face and a bottom surface. The elongated label track can be configured to be positioned against the front face of the shelf. The elongated label track can have a track length and a track width. The track length can be at least ten times the track width. Each of the clips can be as described herein. When the clips are secured to the shelf, the intermediate portion of each of the clips can be configured to retain the elongated label track against the front face of the shelf.

The shelf can include two rows of apertures formed in the top surface. The two rows of apertures can extend substantially parallel to the front surface of the shelf. In some embodiments, the first terminal end of the top portion of each of the clips can include a first locking mechanism configured to be positioned within an aperture of a first row of the two rows of apertures formed in the shelf. In some embodiments, each of the clips can include a second locking mechanism disposed between the first terminal end and the transition portion. The second locking mechanism can be configured to snap fit within an aperture of a second row of the two rows of apertures formed in the shelf to secure the clip to the shelf. In some embodiments, the elongated label track can include two plastic sheets connected relative to each other at a first edge extending the track length and defining an opening along a second edge extending the track length.

In accordance with embodiments of the present disclosure, an exemplary method of securing an elongated label track to a shelf is provided. The shelf can include a top surface, a front face and a bottom surface. The method can include providing clips. Each of the clips can be as described herein. The method can include positioning an elongated label track against a front face of the shelf. The method can include securing the top portion of each of the clips to a top surface of the shelf. The method can include positioning the intermediate portion of each of the clips over the elongated label track to retain the elongated label track against the front face of the shelf. The method can include engaging the bottom portion of each of the clips to a bottom surface of the shelf to support the elongated label track.

Any combination and/or permutation of embodiments is envisioned. Other objects and features will become apparent from the following detailed description considered in conjunction with the accompanying drawings. It is to be understood, however, that the drawings are designed as an illustration only and not as a definition of the limits of the present disclosure.

BRIEF DESCRIPTION OF THE DRAWINGS

To assist those of skill in the art in making and using the disclosed clips and associated systems and methods, reference is made to the accompanying figures, wherein.

DETAILED DESCRIPTION

Figure 1:
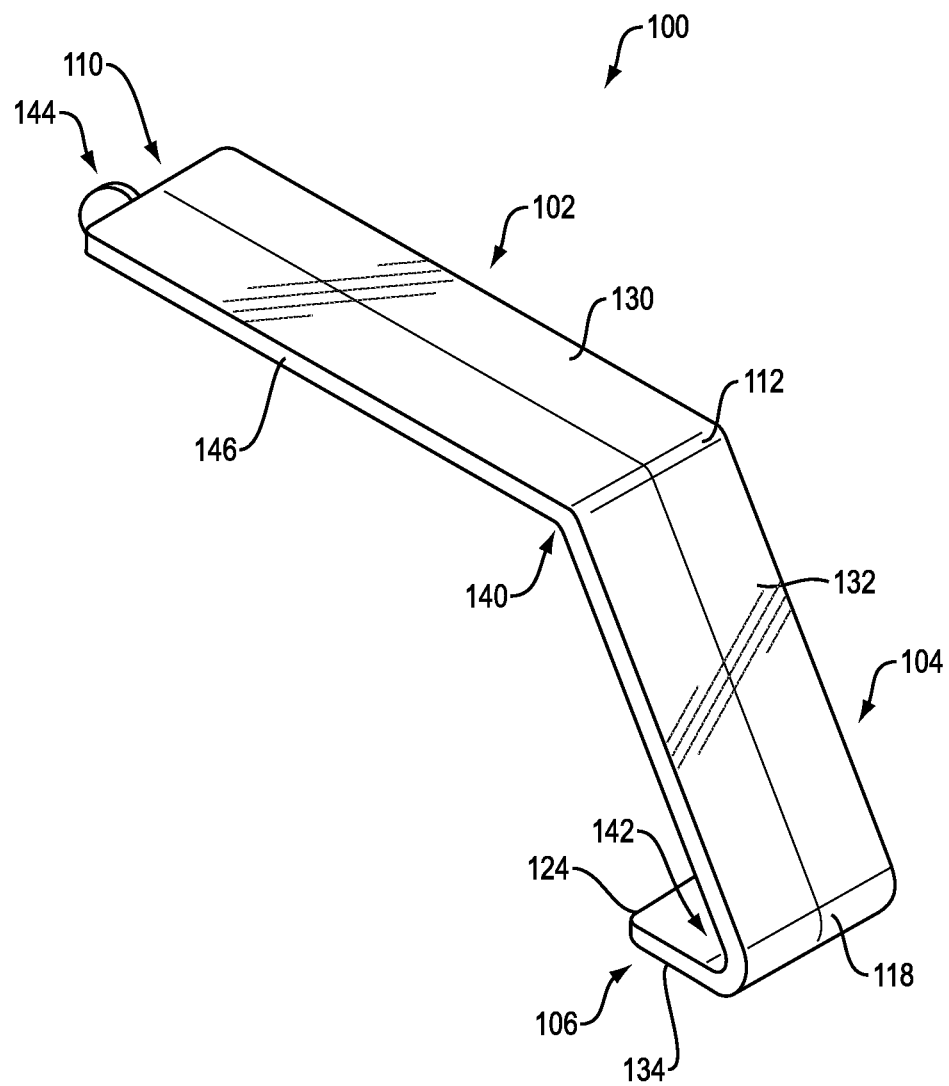
FIG. 1 is a perspective view of an exemplary clip in accordance with embodiments of the present disclosure.
Figure 2:
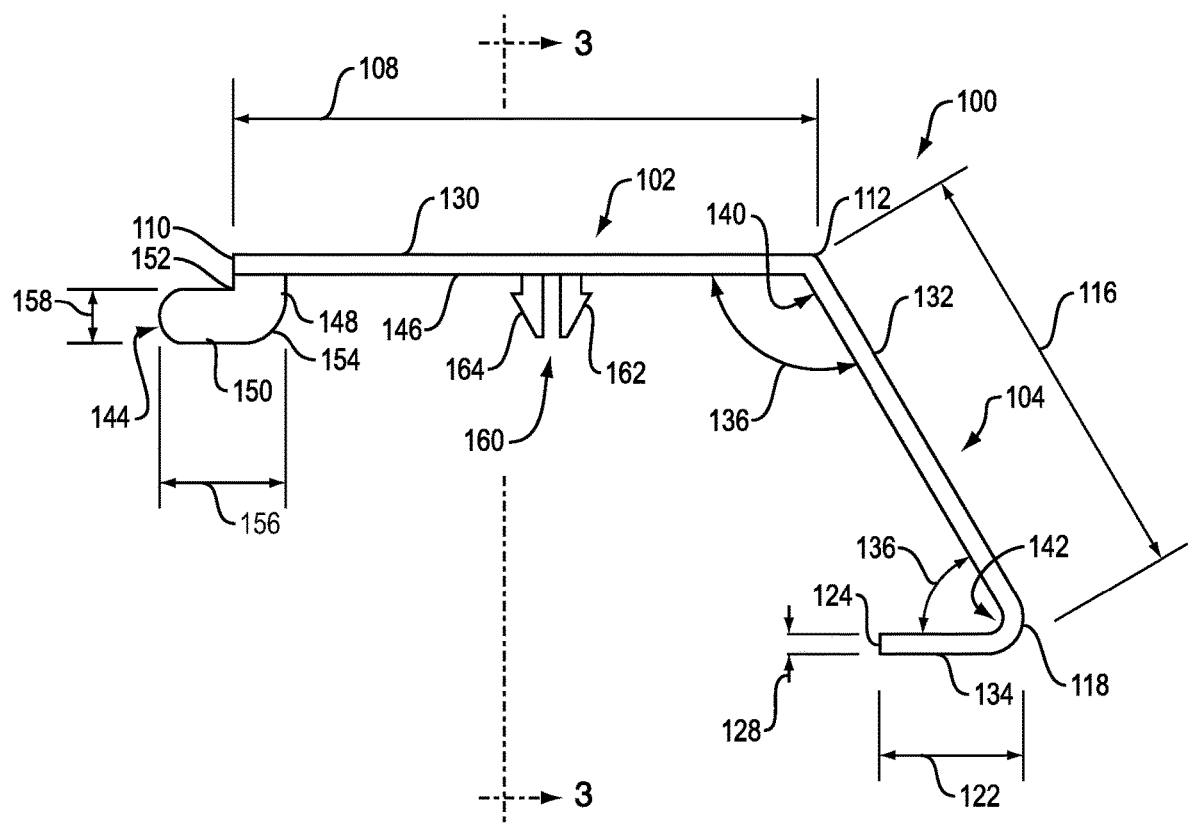
FIG. 2 is a side view of an exemplary clip of FIG. 1.
Figure 3:
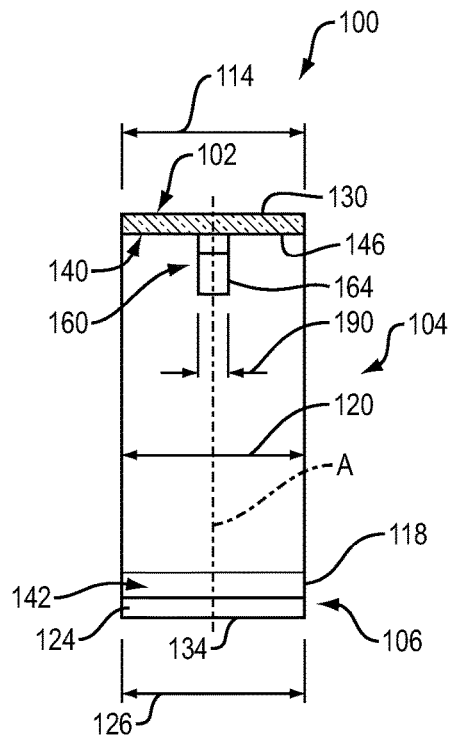
FIG. 3 is a cross-sectional view of an exemplary clip of FIG. 1 along section 3-3 of FIG. 2.
Figure 4:
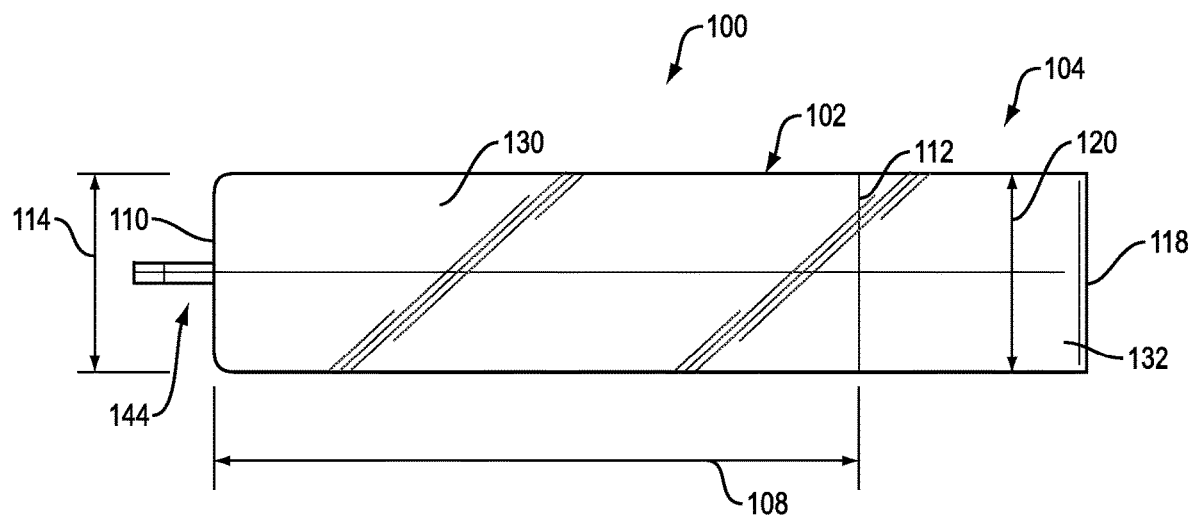
FIG. 4 is a top view of an exemplary clip of FIG. 1.

Exemplary embodiments of the present disclosure overcome the disadvantages of conventional systems and methods of affixing labels to shelves by providing for clips that advantageously engage the top, front and bottom surfaces of the shelf to secure an elongated label track against the front face of the shelf. FIGS. 1-5 show perspective, side, cross-sectional, top and detailed views, respectively, of an exemplary clip 100. The clip 100 can be formed from a plastic material that is capable of being molded and, once set, provides sufficient flexibility for engaging the clip 100 with a shelf while further providing sufficient stiffness to secure a label track to the shelf. The clip 100 includes a top portion 102, an intermediate portion 104 and a bottom portion 106.

The top portion 102 defines a length 108 (e.g., a first length) extending from a first terminal end 110 of the clip 100 to a first transition portion 112. In some embodiments, the length 108 can be dimensioned as approximately 1 inch to approximately 2 inches. The first terminal end 110 can define a distal end of the top portion 102 and the first transition portion 112 can define a proximal end of the top portion 102. The first terminal end 110 and the first transition portion 112 are located on opposing sides of the length 108 of the top portion 108. The top portion 108 defines a width 114 that can be substantially uniform along the entire length 108 of the top portion 108. In some embodiments, the width 114 can be dimensioned as approximately 0.4 inches to approximately 0.8 inches.

The intermediate portion 104 defines a length 116 (e.g., a second length). The length 116 can extend from the first transition portion 112 (e.g., a distal end of the intermediate portion 104) to a second transition portion 118 (e.g., a proximal end of the intermediate portion 104). The first transition portion 112 and the second transition portion 118 are located on opposing sides of the length 116 of the intermediate portion 104. The intermediate portion 104 defines a width 120 that can be dimensioned substantially similarly to the width 114 of the top portion 108.

The bottom portion 106 defines a length 122 (e.g., a third length) extending from the second transition portion 118 (e.g., a distal end of the bottom portion 106) to a second terminal end 124 (e.g., a proximal end of the bottom portion 106) of the clip 100. In some embodiments, the length 122 can be dimensioned as approximately 0.4 inches to approximately 0.8 inches. Thus, the length 108 of the top portion 102 can be dimensioned greater than the lengths 116 and 122 of the intermediate portion 104 and the bottom portion 106, respectively, and the length 116 of the intermediate portion 104 can be dimensioned greater than the length 122 of the bottom portion 106. The bottom portion 106 defines a width 126 that can be dimensioned substantially similarly to the width 114, 120 of the top portion 108 and the intermediate portion 104, respectively. The top, intermediate and bottom portions 102, 104, 106 can define the same thickness 128 that can be dimensioned as approximately 0.04 inches to approximately 0.08 inches. As shown in the cross-sectional view of FIG. 3, the top, intermediate and bottom portions 102, 104, 106 of the clip 100 can be substantially aligned along a central vertical axis A.

The top portion 102 and the intermediate portion 104 can be connected or extend relative to each other at the first transition portion 112. The intermediate portion 104 and the bottom portion 106 can be connected or extend relative to each other at the second transition portion 118. The transitions between the top, intermediate and bottom portions 102, 104, 106 can be substantially smooth and uniform, thereby forming a single unitary structure for the body of the clip 100. In some embodiments, the top, intermediate and bottom portions 102, 104, 106 can be connected or extend relative to each other such that the top portion 102 extends substantially parallel to the bottom portion 106, and the intermediate portion extends a first angle with respect to the top portion 102 and a second angle with respect to the bottom portion, as described herein.

A top surface 130 of the top portion 102 can define a (first) plane, the top surface 132 of the intermediate portion 104 can define a (second) plane that is angled relative to and intersects the (first) plane of the top portion 102, and the top surface 134 of the bottom portion 106 can define a (third) plane that is substantially parallel to the (first) plane of the top portion 102 and angled relative to the (second) plane of the intermediate portion 104. In some embodiments, an (interior) angle 136 formed at the connection of the top portion 102 and the intermediate portion 104 at the first transition portion 112 (e.g., the angle 136 between the plane defined by the top portion 102 and the plane defined by the intermediate portion 104) can be obtuse. In some embodiments, the angle 136 can be dimensioned as approximately 120° or between a range of approximately 100° to approximately 140°. In some embodiments, an (interior) angle 138 formed at the connection of the intermediate portion 104 and the bottom portion 106 at the second transition portion 118 (e.g., the angle 138 between the plane defined by the intermediate portion 104 and the plane defined by the bottom portion 106) can be acute. In some embodiments, the angle 138 can be dimensioned as approximately 60° or between a range of approximately 40° to approximately 80°. Thus, the intermediate portion 104 can be oriented in a non-perpendicular manner relative to the top and bottom portions 102, 106.

In some embodiments, the connection of the top portion 102 and the intermediate portion 104 at the first transition portion 112 can form a sharp/pointed corner 140. In particular, the sharp corner 140 can define a minimal radius for manufacturing (e.g., a radius of 0 inches). In some embodiments, the connection of the intermediate portion 104 and the bottom portion 106 at the second transition portion 118 can form a rounded/bullnose corner 142. In particular, the rounded corner 142 can include a chamfer with a radius of approximately 0.06 inches or a range of approximately 0.04 to approximately 0.08 inches. In some embodiments, the rounded corner 142 provides for an improved fit of the clip 100 relative to the shelf.

In some embodiments, the top portion 102 can include a locking mechanism 144 (e.g., a first locking mechanism) disposed at or near the first terminal end 110. The locking mechanism 144 can be positioned substantially centrally relative to the width 114 of the top portion 102 and can be aligned with the central vertical axis A. The locking mechanism 144 can be in the form of an L-shaped or hook-shaped protrusion extending from a bottom surface 146. In particular, the locking mechanism 144 can include a vertical extension 148 extending substantially perpendicularly from the bottom surface 146 of the top portion 102, and further includes a horizontal extension 150 extending substantially perpendicularly from the vertical extension 148 in a direction way from the intermediate portion 104. In some embodiments, an inner corner 152 at the connection of the vertical and horizontal extensions 148, 150 can be substantially sharp (e.g., a radius of zero inches).

In some embodiments, an outer corner 154 at the connection of the vertical and horizontal extensions 148, 150 can be substantially rounded (e.g., a radius greater than zero inches). As will be discussed in greater detail below, the sharp and rounded corners of the locking mechanism 144 can assist with engagement of the locking mechanism 144 with apertures formed in the top surface of the shelf. In some embodiments, a length 156 defined by the locking mechanism 144 can be dimensioned as approximately 0.4 inches or a range of approximately 0.3 inches to approximately 0.5 inches. In some embodiments, a width 158 of the horizontal extension 150 of the locking mechanism 144 can be dimensioned as approximately 0.2 inches or a range of approximately 0.1 inches to approximately 0.3 inches.

In some embodiments, the top portion 102 can include a locking mechanism 160 (e.g., a second locking mechanism) disposed between the first terminal end 110 and the first transition portion 112 of the top portion 102. The locking mechanism 160 can be positioned substantially centrally relative to the width 114 of the top portion 102 and can be aligned with the central vertical axis A. The locking mechanism 160 can be in the form of two separated protrusions 162, 164 extending substantially perpendicularly away from the bottom surface 146 of the top portion 102. The inner surfaces 166, 168 of the protrusions 162, 164 facing each other can be substantially planar, thereby forming a uniform channel 170 between the inner surfaces 166, 168 of the protrusions 162, 164. In some embodiments, a width 172 of the channel 170 can be dimensioned as approximately 0.06 inches or a range of approximately 0.04 to approximately 0.08 inches.

Figure 5:
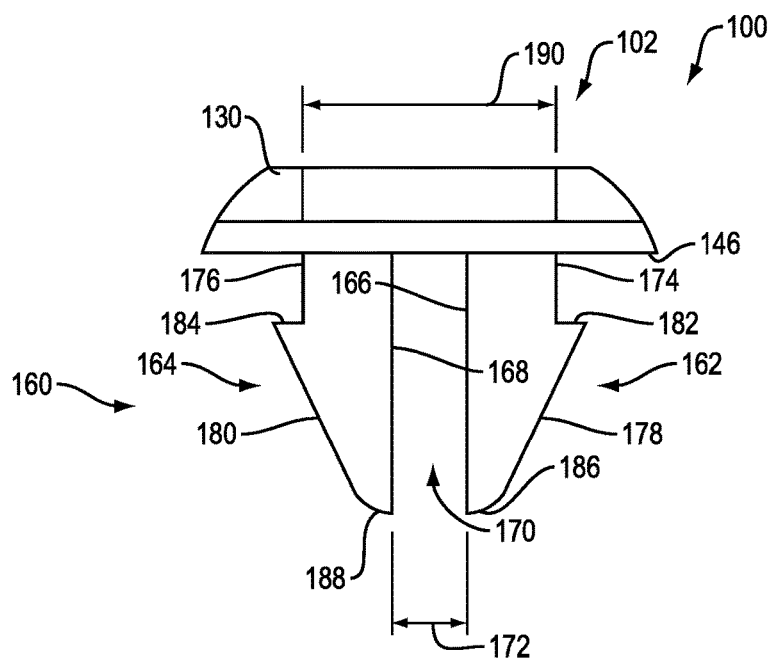
FIG. 5 is a detailed view of an exemplary clip of FIG. 1.

The outer surface of each protrusion 162, 164 facing away from each other can include a narrow extension 174, 176 connected to the bottom surface 146 and a head portion 178, 180 at a distal end of the narrow extension 174, 176. The transition or connection between the narrow extension 174, 176 and the head portion 178, 180 can include a protruding edge 182, 184. Each head portion 178, 180 can include a distal end forming an insertion point 186, 188. In some embodiments, the insertion point 186, 188 can define a sharp corner or connection between the inner surface 166, 168 and the head portion 178, 180. In some embodiments, as shown in FIG. 5, the insertion point 186, 188 can define a rounded corner or connection between the inner surface 166, 168 and the head portion 178, 180 (e.g., a radius greater than zero inches, such as, for example, approximately 0.030 inches). In some embodiments, the width 190 of each of the protrusions 162, 164 can be dimensioned as approximately 0.1 inches or a range of approximately 0.05 inches to approximately 0.15 inches.

As will be discussed in greater detail below, the material of fabrication of the locking mechanism 160 can be formed such that the protrusions 162, 164 can be snap fit into an aperture formed in the top surface of the shelf. In particular, the protrusions 162, 164 can flex towards each other to reduce the width 172 of the channel 170 during insertion of the locking mechanism 160 into the aperture and, upon insertion into the aperture, the protrusions 162, 164 can expand to the natural position with the uniform width 172 such that the protruding edges 182, 184 prevent removal of the locking mechanism 160 from the aperture.

Figure 6A:
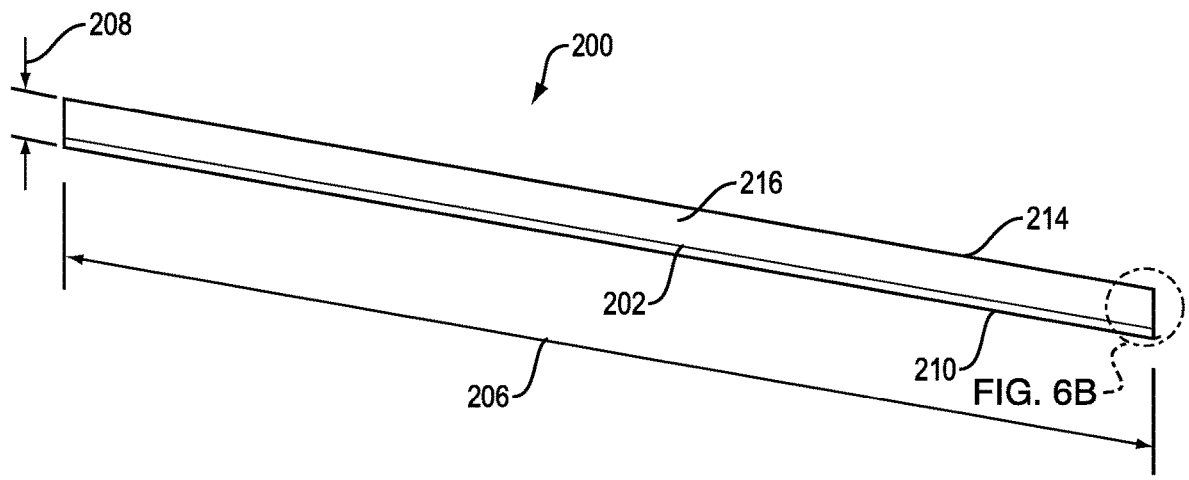
FIGS. 6A and 6B are perspective and detailed view of an exemplary elongated label track in accordance with embodiments of the present disclosure.
Figure 6B:
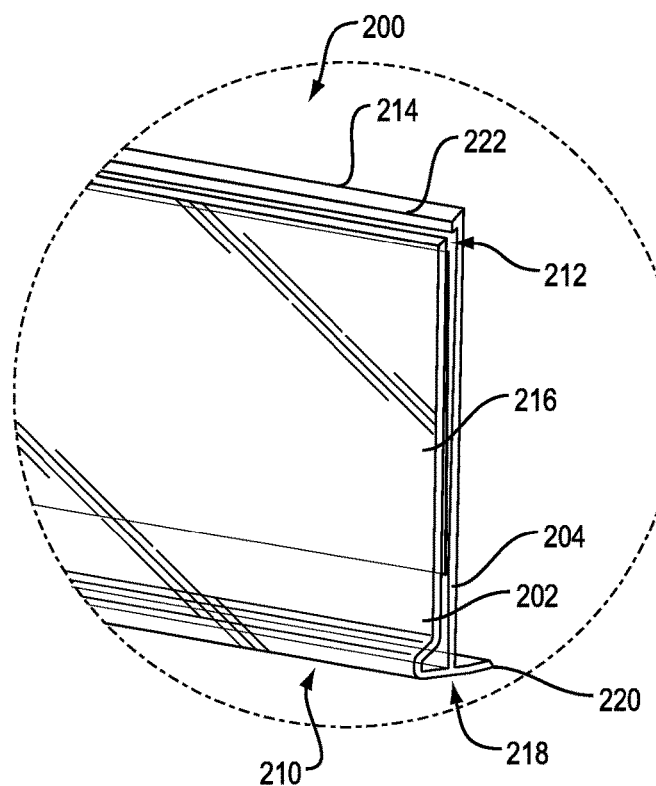
Figure 7:
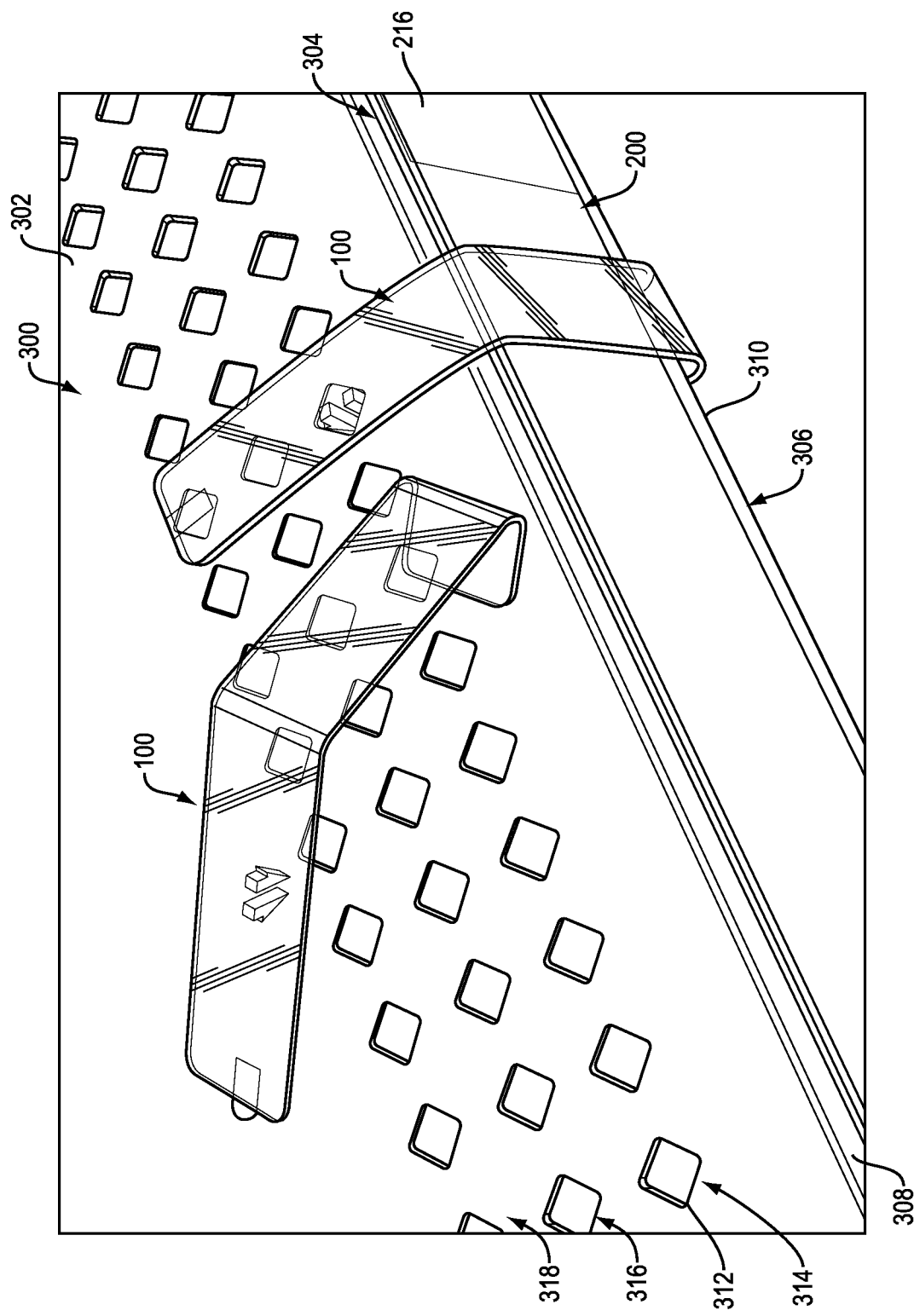
FIG. 7 is a perspective view of an exemplary assembly of a shelf, an elongated label track and a clip in accordance with embodiments of the present disclosure.
Figure 8:
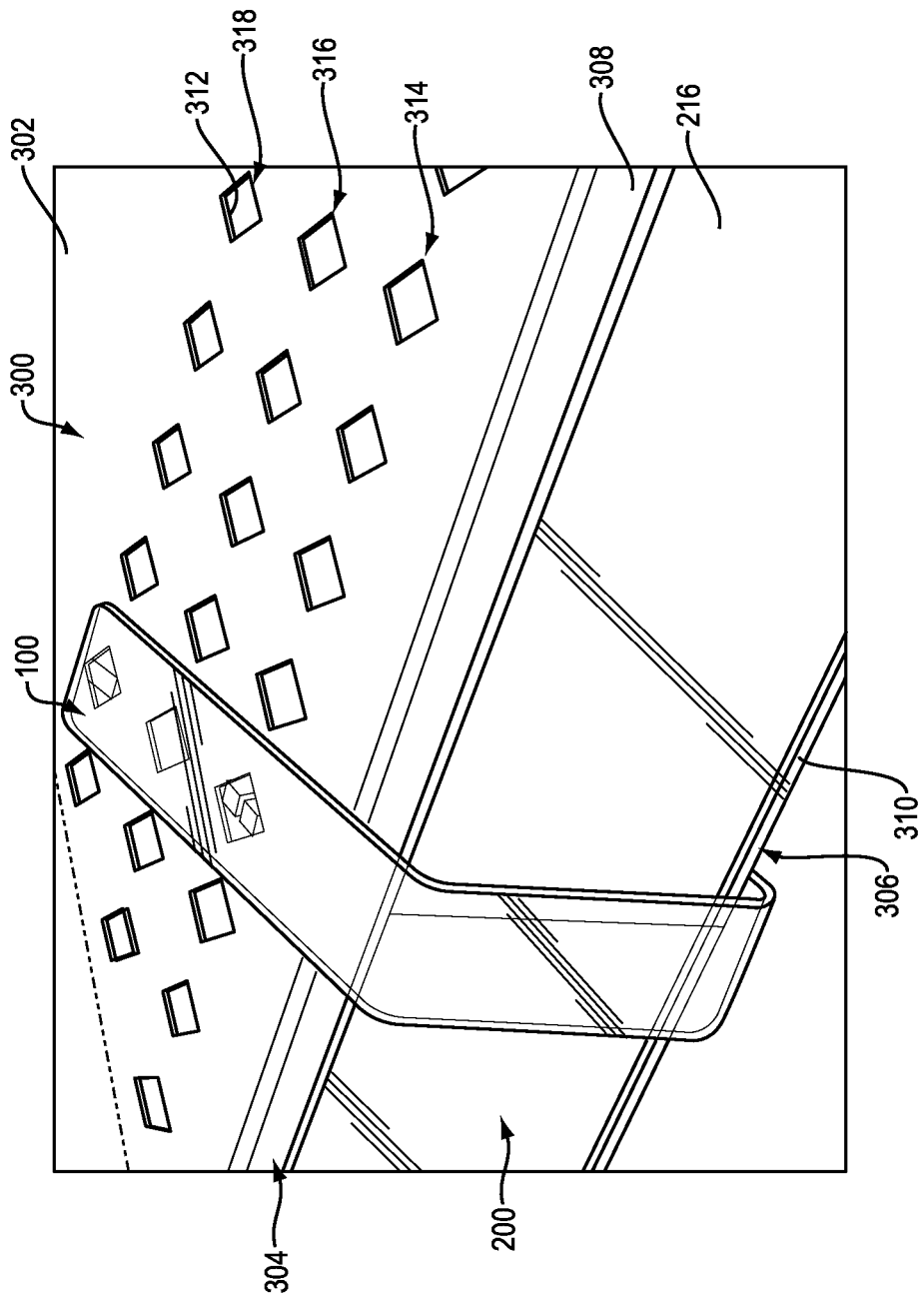
FIG. 8 is a perspective view of an exemplary assembly of a shelf, an elongated label track and a clip in accordance with embodiments of the present disclosure.
Figure 9:
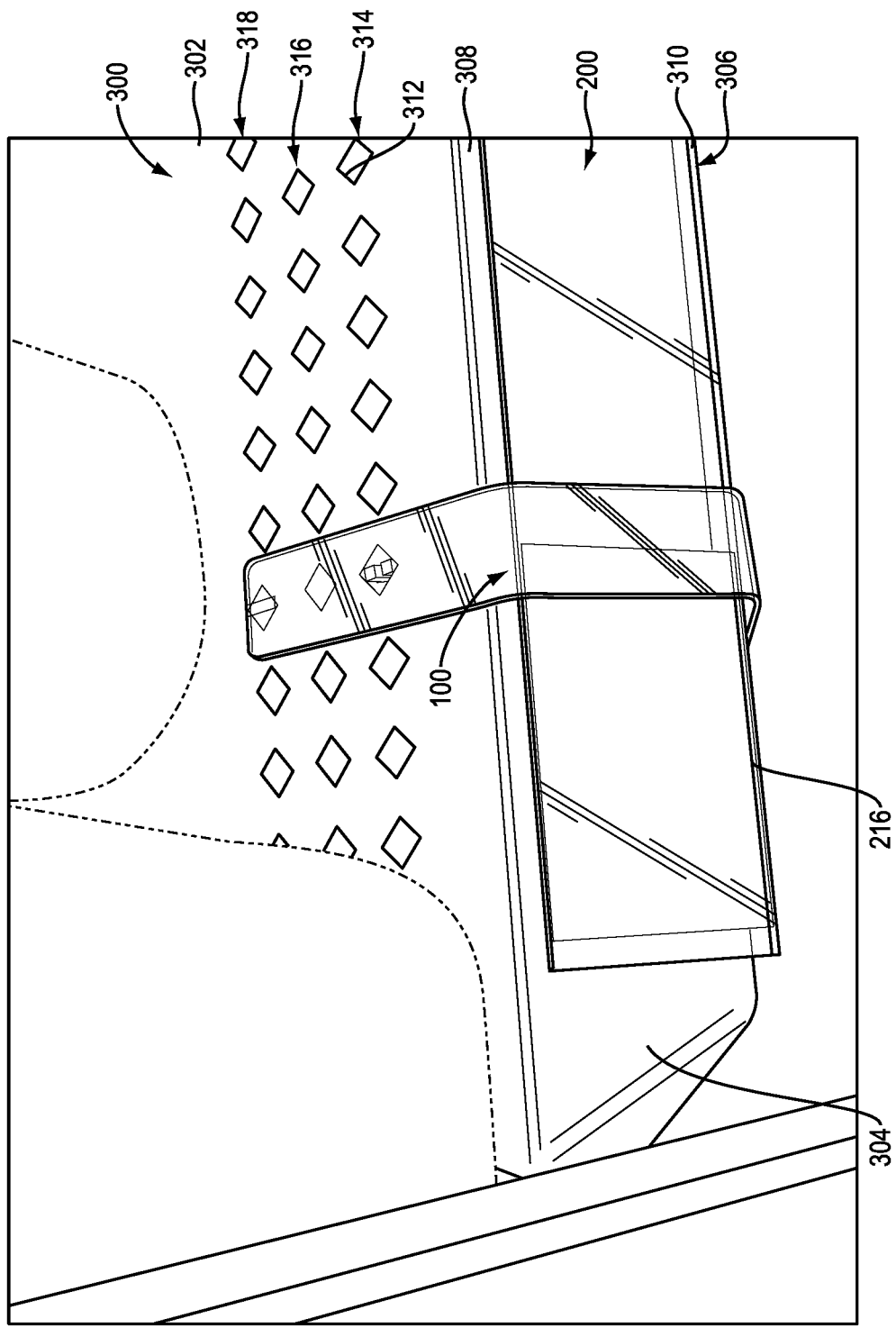
FIG. 9 is a perspective view of an exemplary assembly of a shelf, an elongated label track and a clip in accordance with embodiments of the present disclosure.
Figure 10:
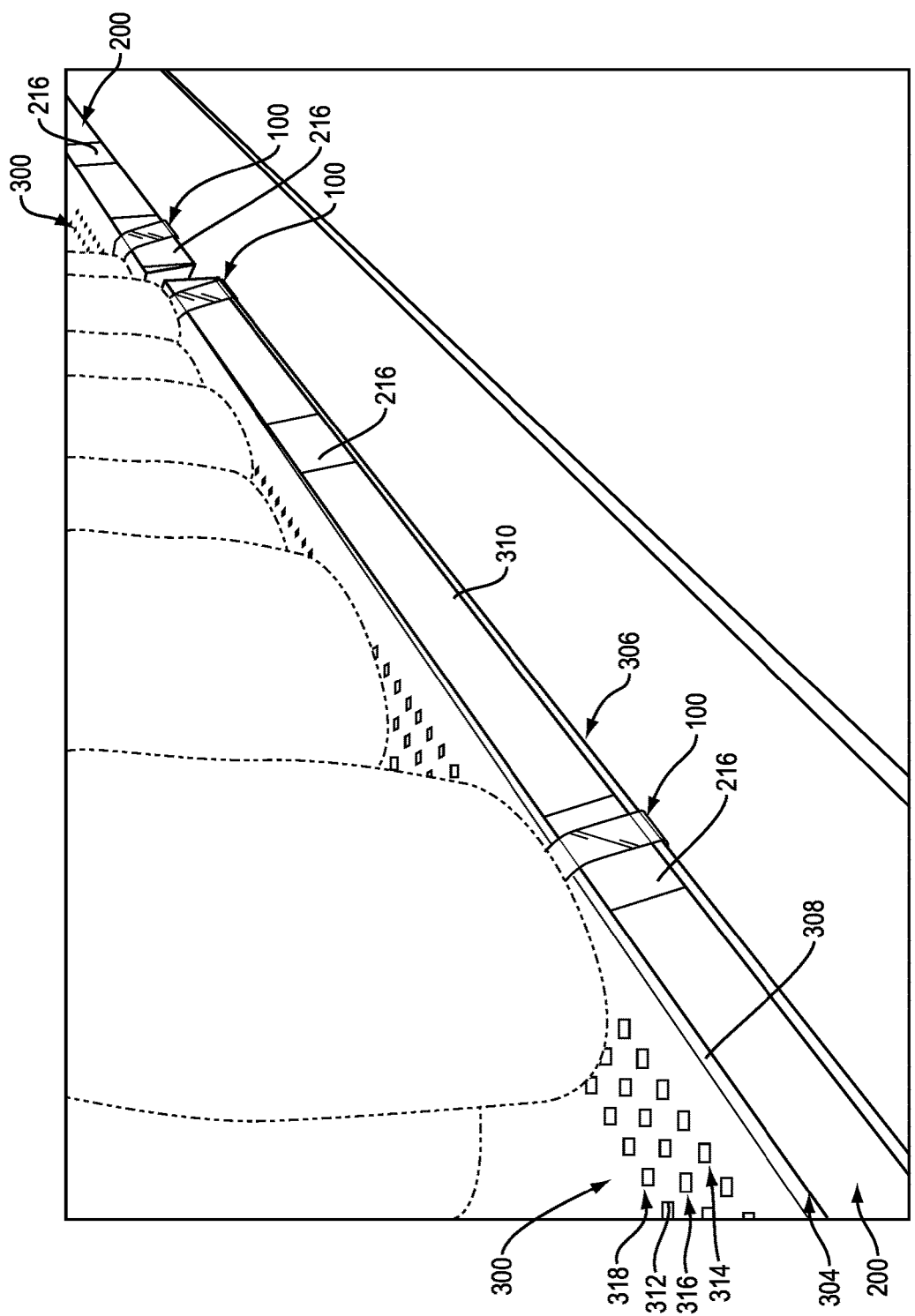
FIG. 10 is a perspective view of exemplary assemblies of shelves, elongated label tracks and clips in accordance with embodiments of the present disclosure.

With reference to FIGS. 6A and 6B, perspective and detailed views of an exemplary elongated label track 200 are provided. The label track 200 can be formed from two sheets portions (e.g., a first sheet 202 and a second sheet 204). In some embodiments, the first sheet 202 can define a front side of the label track 200 (e.g., the side facing away from a shelf face when the track is mounted on the shelf face) and the second sheet 204 can define a rear side of the label track 200 (e.g., the side facing towards a shelf face when the track is mounted on the shelf face). In some embodiments, the first and second sheets 202, 204 can integrally or separately be fabricated from a plastic material. In some embodiments, the first sheet 202 can be substantially transparent or partially transparent, and the second sheet 202 can be opaque. In some embodiments, both the first and second sheets 202, 204 can be substantially transparent or partially transparent.

The label track 200 defines a length 206 and a width 208. In some embodiments, the length 206 of the label track 200 can be dimensioned at least ten times the dimension of the width 208. In some embodiments, the length 206 can be dimensioned as approximately 46 inches or a range of approximate 12 inches to approximately 82 inches. The first and second sheets 202, 204 can be connected or joined relative to each other along a first edge 210 extending the length 206 of the label track 200. The label track 200 can include an opening 212 between the first and second sheets 202, 204 along a second edge 214 extending the length 206 of the label track 200. The first and second edges 210, 214 can be disposed on opposing sides of the width 208 of the label track 200.

The opening 212 allows the first and second sheets 202, 204 to be separated relative to each other to increase the width of the opening 212 such that one or more labels 216 can be inserted between the first and second sheets 202, 204. After insertion of the label 216, the first and second sheets 202, 204 can spring back to the normal position, e.g., the first and second sheets 202, 204 being positioned substantially against each other. One or more labels 216 can thereby be "sandwiched" between the first and second sheets 202, 204.

The vertical extension of the first and second sheets 202, 204 of the label track 200 can define a vertical plane. In some embodiments, the first edge 210 of the label track 200 can include a protrusion 218 extending the length 206 of the label track 200. The protrusion 218 can extend substantially perpendicularly to the vertical plane defined by the first and second sheets 202, 204. In some embodiments, a rear edge 220 of the protrusion 218 can be configured and dimensioned to be positioned against the bottom surface of the shelf to prevent or reduce undesired movement of the label track 200 relative to the shelf.

In some embodiments, the second sheet 204 can include a protrusion 222 extending perpendicularly from the second edge 214. The protrusion 222 can be configured and dimensioned to cover or overlap the opening 212 between the first and second sheets 202, 204. Thus, if the label 216 slides upward and through the opening 212 between the first and second sheets 202, 204, the protrusion 222 can prevent the label 216 from sliding completely out of the label track 200. The label 216 can thereby be maintained in a "sandwiched" configuration within the label track 200.

With reference to FIGS. 7-10, perspective views of assemblies of a shelf 300, an elongated label track 200 and clips 100 (e.g., a system) are provided. The shelf 300 can include a top surface 302, a front face 304 and a bottom surface 306. The top surface 302 can be connected to the front face 304 along a first edge 308. The front face 304 can be connected to the bottom surface 306 along a second edge 310. In some embodiments, one or both of the first and second edges 308, 310 can define a rounded corner (e.g., a corner defining a radius greater than zero inches). In some embodiments, the top surface 302 and the bottom surface 306 can extend substantially parallel relative to each other. In some embodiments, rather than including a bottom surface 306, the shelf 300 can include only a top surface 302, a front face 304, and a second edge 310 formed by the distal end of the front face 304, leaving an empty cavity behind the top surface 302 and the front face 304.

In some embodiments, the angle of a plane defined by the front face 304 relative to planes defined by the top and bottom surfaces 302, 306 can be different. In particular, the angle between the plane defined by the front face 304 and the plane defined by the top surface 302 can be different from the angle between the plane defined by the front face 304 and the plane defined by the bottom surface 306. Thus, the front face 304 can be oriented in a non-perpendicular manner relative to the top and bottom surface 302, 306. The angled orientation assists in providing an improved angle for customers to visualize the information provided on the labels 216.

The top surface 302 of the shelf 300 can include two or more rows of apertures 312 formed therein (e.g., a first row 314, a second row 316, a third row 318, or the like). Each of the rows 314, 316, 318 can be substantially parallel to the first edge 308 of the shelf 300 and substantially parallel relative to each other. In some embodiments, the apertures 312 can be configured in the shape of, e.g., a diamond, a circle, a square, a rectangle, a triangle, an oval, or the like. The apertures 312 in each of the rows 314, 316, 318 can be substantially aligned relative to each other.

During use, one or more labels 216 can be "sandwiched" between the first and second sheets 202, 204 of the label track 200. The label track 200 can be positioned against the front face 304 of the shelf 300. The dimensions and substantially flat configuration of the label track 200 can conform to the substantially flat configuration of the front face 304 of the shelf 300. In some embodiments, the rear edge 220 of the protrusion 218 of the label track 200 can be positioned against the bottom surface 306 of the shelf 300 such that the connection between the second sheet 204 and the protrusion 218 is positioned against the second edge 310 of the shelf 300. The protrusion 218 can prevent the label track 200 from sliding upwards above the top surface 302 of the shelf 300.

The distal end of the horizontal extension 150 of the locking mechanism 144 can be inserted into an aperture 312 of the third row 318 (e.g., the row furthest away from the first edge 308 of the shelf 300). The locking mechanism 144 can be pushed into the aperture 312 until the inner corner 152 abuts an edge of the aperture 312. The top portion 102 of the clip 100 can be pushed downward such that the bottom surface 146 of the clip 100 is positioned against the top surface 302 of the shelf 300. Pushing the clip 100 downward can force the protrusions 162, 164 of the locking mechanism 160 into an aperture 312 of the first row 312 (e.g., the row closest to the first edge 308 of the shelf 300).

In particular, the protrusions 162, 164 can flex towards each other and force can be imparted on the top portion 102 of the clip 100 to force the locking mechanism 160 into the aperture 312 beyond the protruding edges 182, 184 of the locking mechanism 160. Once the protruding edges 182, 184 have passed through the aperture 312, the protrusions 162, 164 can expand to the normal position such that the protruding edges 182, 184 extend beyond the edges of the aperture 312 and prevent the locking mechanism 160 from being pulled out of the aperture 312. Thus, a snap fit of the locking mechanism 160 relative to the aperture 312 can be created to lock the top portion 102 of the clip 100 relative to the top surface 302 of the shelf 300.

The intermediate portion 104 of the clip 100 can be positioned against the label track 200 such that the label track 200 is "sandwiched" between the front face 304 of the shelf 300 and the intermediate portion 104 of the clip 100 and the clip 100 retains the label track 200 in position with respect to the front face 304. The bottom portion 106 of the clip 100 can be flexed to pass and snap around the second edge 310 of the shelf 300. In some embodiments, a space or pocket can be formed between the rounded corner 142 of the clip 100 and the label track 200 and/or the second edge 310 of the shelf 300. Snapping of the bottom portion 106 around the second edge 310 can secure the clip 100 to the bottom surface 306 and/or the second edge 310 of the shelf 300, thereby preventing the clip 100 from being disengaged from the shelf 300. In some embodiments, multiple clips 100 can be attached to the shelf 300 along the length 206 of the label track 200 to maintain the entire length 206 of the label track 200 secured to the shelf 300. The clip(s) 100 can therefore advantageously maintain the label track 200 secured to the front face 304 of the shelf 300 and the label track 200 can be removed only if the clip 100 is detached from the shelf 300 by reversing the attachment steps described above or, in some embodiments, by sliding the label track laterally along a length of the shelf.

Figure 11:
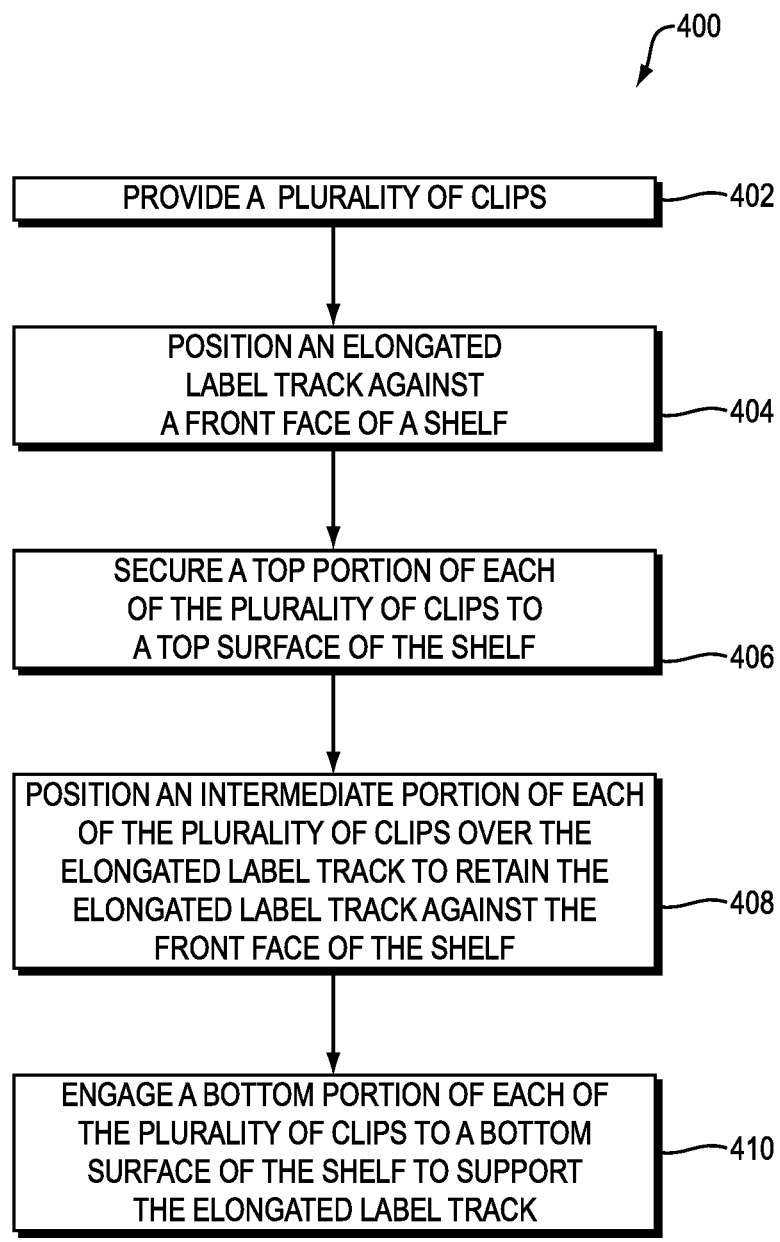
FIG. 11 is a flowchart illustrating an implementation of an exemplary clip in accordance with embodiments of the present disclosure.

FIG. 11 is a flowchart illustrating an exemplary process 400 of implementing the clip 100 during assembly with a label track 200 and a shelf 300. To being, at step 402, clips can be provided. At step 404, an elongated label track can be positioned against a front face of the shelf. At step 406, a top portion of each of the clips can be secure to a top surface of the shelf. At step 408, an intermediate portion of each of the clips can be positioned over the elongated label track to retain the elongated label track against the front face of the shelf. At step 410, a bottom portion of each of the clips can be engaged with a bottom surface of the shelf to support the elongated label track. The clips can thereby be used to maintain the label track secured to the shelf.

While exemplary embodiments have been described herein, it is expressly noted that these embodiments should not be construed as limiting, but rather that additions and modifications to what is expressly described herein also are included within the scope of the invention. Moreover, it is to be understood that the features of the various embodiments described herein are not mutually exclusive and can exist in various combinations and permutations, even if such combinations or permutations are not made express herein, without departing from the spirit and scope of the invention.

The invention claimed is:

1. A system for securing an elongated label track to a shelf or base deck, the system comprising:
   the shelf or base deck including a top surface, a front face and a bottom surface;
   an elongated label track configured to be positioned against the front face of the shelf or base deck, the elongated label track having a track length and a track width; and
   a plurality of clips, each of the plurality of clips including (i) a top portion having a first length extending from a first terminal end of the clip to a first transition portion, the top portion configured to secure to the top surface of the shelf or base deck, (ii) an intermediate portion having a second length extending from the first transition portion to a second transition portion, and (iii) a bottom portion having a third length extending from the second transition portion to a second terminal end of the clip, the bottom portion extending parallel to the top portion and defining an endpoint of the clip, the bottom portion configured to engage a bottom surface of the shelf or base deck and support the elongated label track;
   wherein the track width of the elongated label track is dimensioned substantially equal to the second length of the intermediate portion and configured to be bounded by the first and second transition portions of the clip; and
   wherein the intermediate portion extends at a first angle with respect to the top portion and a second angle with respect to the bottom portion, the first angle forming an interior angle that is an obtuse angle between 100° and 140°, and the second angle forming an interior angle that is an acute angle between 40° and 80°.

2. The system of claim 1, wherein when the plurality of clips are secured to the shelf or base deck, out of the top portion, the intermediate portion, and the bottom portion, only the intermediate portion of each of the plurality of clips is configured to sandwich the elongated label track against the shelf or base deck.

3. The system of claim 1, wherein the track length of the elongated label track is configured to extend beyond side portions of the clip.

4. The system of claim 1, wherein the shelf or base deck comprises two rows of apertures formed in the top surface, the two rows of apertures extending parallel to the front face of the shelf.

5. The system of claim 4, wherein the first terminal end of the top portion of each of the plurality of clips comprises a first locking mechanism configured to be positioned within an aperture of a first row of the two rows of apertures formed in the shelf or base deck.

6. The system of claim 5, wherein each of the plurality of clips comprises a second locking mechanism disposed between the first terminal end and the first transition portion, the second locking mechanism being configured to snap fit within an aperture of a second row of the two rows of apertures formed in the shelf or base deck to secure the clip to the shelf or base deck.

7. The system of claim 1, wherein the elongated label track comprises two plastic sheets connected relative to each other at a first edge extending the track length and defining an opening along a second edge extending the track length.

8. A method of securing an elongated label track to a shelf or base deck, the shelf or base deck including a top surface, a front face and a bottom surface, the elongated label track including a width and a length, the method comprising:
   providing a plurality of clips, each of the plurality of clips including (i) a top portion having a first length extending from a first terminal end of the clip to a first transition portion, the top portion configured to secure to the top surface of the shelf or base deck, (ii) an intermediate portion having a second length extending from the first transition portion to a second transition portion, and (iii) a bottom portion having a third length extending from the second transition portion to a second terminal end of the clip, the bottom portion extending parallel to the top portion and defining an endpoint of the clip, the bottom portion configured to engage the bottom surface of the shelf or base deck and support the elongated label track, wherein the intermediate portion extends at a first angle with respect to the top portion and a second angle with respect to the bottom portion, the first angle forming an interior angle that is an obtuse angle between 100° and 140°, and the second angle forming an interior angle that is an acute angle between 40° and 80°;
   positioning an elongated label track against the front face of a shelf or base deck;
   securing the top portion of each of the plurality of clips to the top surface of the shelf or base deck;
   positioning the intermediate portion of each of the plurality of clips over the elongated label track; and engaging the bottom portion of each of the plurality of clips to the bottom surface of the shelf or base deck to support the elongated label track,
wherein the width of the elongated label track is dimensioned substantially equal to the second length of the intermediate portion and bounded by the first and second transition portions of the clip.

\* \* \* \* \*